(12) United States Patent
Zhan et al.

(10) Patent No.: US 10,084,656 B2
(45) Date of Patent: Sep. 25, 2018

(54) TRILL NETWORK ESTABLISHING METHOD, NODE, AND SYSTEM

(71) Applicant: Huawei Technologies Co., Ltd., Shenzhen (CN)

(72) Inventors: Changgui Zhan, Shenzhen (CN); Guangrui Wu, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 579 days.

(21) Appl. No.: 14/510,323

(22) Filed: Oct. 9, 2014

(65) Prior Publication Data
US 2015/0023215 A1    Jan. 22, 2015

Related U.S. Application Data

(63) Continuation of application No. PCT/CN2013/086184, filed on Oct. 30, 2013.

(30) Foreign Application Priority Data

Nov. 7, 2012    (CN) .......................... 2012 1 0440855

(51) Int. Cl.
*H04L 12/02*    (2006.01)
*H04L 12/24*    (2006.01)
(Continued)

(52) U.S. Cl.
CPC .......... *H04L 41/12* (2013.01); *H04L 12/4633* (2013.01); *H04L 45/02* (2013.01); *H04L 45/66* (2013.01); *Y02D 30/30* (2018.01)

(58) Field of Classification Search
CPC . H04L 2012/445; H04L 45/66; H04L 49/351; H04L 49/604
See application file for complete search history.

(56) References Cited

U.S. PATENT DOCUMENTS

2011/0235523 A1* 9/2011 Jha .......................... H04L 45/66
370/242
2013/0138832 A1    5/2013 Qi et al.
(Continued)

FOREIGN PATENT DOCUMENTS

CN    102204186 A    9/2011
CN    102404216 A    4/2012
(Continued)

OTHER PUBLICATIONS

IEEE STD 802.11AB-2009, "Station and Media Access Control Connectivity Discovery", Sep. 17, 2009, pp. 1-190.*
Ko, M., et al., "A Case for Convergence Enhanced Ethernet: Requirements and Applications," IEEE International Conference on Communications, May 19-23, 2008, pp. 5702-5707.
(Continued)

*Primary Examiner* — Andrew W Chriss
*Assistant Examiner* — Kenan Cehic
(74) *Attorney, Agent, or Firm* — Conley Rose, P.C.

(57) ABSTRACT

A Transparent Interconnection of Lots of Links (TRILL) network establishing method, node, and system. The TRILL network establishing method includes: receiving, by a first node, a Link Layer Discovery Protocol (LLDP) packet, where an optional type-length-value (TLV) field of the LLDP packet includes TRILL capability information of a second node that sends the LLDP packet; and if it is determined, according to the TRILL capability information, that the second node has a TRILL capability, and the first node itself also has the TRILL capability, configuring, by the first node, a port, through which the LLDP packet is received, of the first node, to have a TRILL function enabled. The node in embodiments of the present invention can automatically enable or disable the TRILL function, so as to implement automatic establishment of a TRILL network.

7 Claims, 3 Drawing Sheets

(51) Int. Cl.
*H04L 12/751* (2013.01)
*H04L 12/721* (2013.01)
*H04L 12/46* (2006.01)

(56) References Cited

U.S. PATENT DOCUMENTS

| | | | |
|---|---|---|---|
| 2013/0336165 A1 | 12/2013 | Wakumoto et al. | |
| 2014/0086041 A1* | 3/2014 | Shah | H04L 12/44 370/218 |
| 2016/0173585 A1* | 6/2016 | Vobbilisetty | H04L 12/4625 709/223 |

FOREIGN PATENT DOCUMENTS

| | | |
|---|---|---|
| CN | 102546409 A | 7/2012 |
| CN | 102571555 A | 7/2012 |
| CN | 102647324 A | 8/2012 |
| EP | 2226973 A1 | 9/2010 |
| EP | 2670088 A1 | 12/2013 |

OTHER PUBLICATIONS

Foreign Communication From a Counterpart Application, European Application No. 13853087.8, Extended European Search Report dated Jan. 29, 2015, 6 pages.

Foreign Communication From a Counterpart Application, Chinese Application No. 201210440855.7, Chinese Office Action dated Jul. 1, 2016, 5 pages.

Foreign Communication From a Counterpart Application, Chinese Application No. 201210440855.7, Chinese Search Report dated Jun. 17, 2016, 2 pages.

Eastlake, D., et al., "Transparent Interconnection of Lots of Links (TRILL) Support of the Link Layer Discover Protocol (LLDP)," draft-eastlake-trill-lldp-00.txt, Mar. 6, 2012, 11 pages.

Foreign Communication From a Counterpart Application, PCT Application No. PCT/CN2013/086184, English Translation of International Search Report dated Feb. 20, 2014, 2 pages.

Foreign Communication From a Counterpart Application, PCT Application No. PCT/CN2013/086184, Written Opinion dated Feb. 20, 2014, 4 pages.

* cited by examiner

TRILL NETWORK ESTABLISHING METHOD, NODE, AND SYSTEM

CROSS-REFERENCE TO RELATED APPLICATION

This application is a continuation of International Application No. PCT/CN2013/086184, filed on Oct. 30, 2013, which claims priority to Chinese Patent Application No. 201210440855.7, filed on Nov. 7, 2012, both of which are hereby incorporated by reference in their entireties.

TECHNICAL FIELD

The present application relates to communications network technologies, and in particular, to a Transparent Interconnection of Lots of Links (TRILL) network establishing method, node, and system.

BACKGROUND

TRILL is a protocol for establishing a large-scale data link layer network, where data link layer network is also referred to as layer 2 network.

Generally, when a node that has a TRILL capability is to be connected to a TRILL network, first, it needs to be manually determined whether both the node and a neighboring node that is directly connected to the node have the TRILL capability. If yes, TRILL functions of ports through which the two nodes are directly connected are then enabled by manual configuration. Otherwise, enabling of the TRILL function cannot be configured. In an actual implementation, the TRILL network includes numerous nodes, and link connections are very complex, so that, in a process of establishing the TRILL network according to the foregoing method, configuration work that is manually implemented is not only time-consuming and laborious, but also apt to error. Therefore, in an actual application, a method capable of automatically establishing a TRILL network is urgently needed.

SUMMARY

The present application provides a TRILL network establishing method, node, and system to implement that the node can automatically enable a TRILL function to form a TRILL network.

A first aspect of the present application provides a TRILL network establishing method, including: receiving, by a first node, a Link Layer Discovery Protocol (LLDP) packet, where an optional type-length-value (TLV) field of the LLDP packet includes TRILL capability information of a second node that sends the LLDP packet; and if the first node determines, according to the TRILL capability information, that the second node has a TRILL capability, and the first node also has the TRILL capability, configuring, by the first node, a port through which the LLDP packet is received to have a TRILL function enabled.

With reference to the TRILL network establishing method of the first aspect, in a first implementation of the first aspect, if it is determined, according to the TRILL capability information, that the second node does not have the TRILL capability, the first node configures the port through which the LLDP packet is received to have the TRILL function disabled.

With reference to the TRILL network establishing method of the first aspect, or the first implementation of the first aspect, in a second implementation of the first aspect, after the configuring, by the first node, a port through which the LLDP packet is received to have a TRILL function enabled, the method further includes: when a link between the port of the first node and the second node is disconnected, configuring, by the first node, the port to have the TRILL function disabled.

With reference to the TRILL network establishing method of the first aspect, or any one of the first implementation and the second implementation of the first aspect, in a third implementation of the first aspect, after the configuring, by the first node, a port through which the LLDP packet is received to have a TRILL function enabled, the method further includes: when it is determined, according to an LLDP packet sent again by the second node, that the second node does not have the TRILL capability, configuring, by the first node, the port to have the TRILL function disabled.

With reference to the TRILL network establishing method of the first aspect, and any one of the first implementation to the third implementation of the first aspect, in a fourth implementation of the first aspect, the method further includes: sending, by the first node, an LLDP packet whose optional TLV field is configured with TRILL capability information of the first node, so that a node that receives the LLDP packet including the TRILL capability information of the first node determines, according to the TRILL capability information of the first node, whether to enable a TRILL function of a port through which the LLDP packet sent by the first node is received.

A second aspect of the present application provides a TRILL network establishing node, including: a receiving module configured to receive an LLDP packet, where an optional TLV field of the LLDP packet includes TRILL capability information of a second node that sends the LLDP packet; and a configuring module configured to: if it is determined, according to the TRILL capability information, that the second node has a TRILL capability, and the node also has the TRILL capability, configure a port through which the LLDP packet is received to have a TRILL function enabled.

With reference to the TRILL network establishing node of the second aspect, in a first implementation of the second aspect, the configuring module is further configured to: if it is determined, according to the TRILL capability information, that the second node does not have the TRILL capability, configure the port through which the LLDP packet is received to have the TRILL function disabled.

With reference to the TRILL network establishing node of the second aspect, or the first implementation of the second aspect, in a second implementation, the configuring module is further configured to: when a link between the port and the second node is disconnected, or when it is determined, according to an LLDP packet sent again by the second node, that the second node does not have the TRILL capability, configure the port to have the TRILL function disabled.

With reference to the TRILL network establishing node of the second aspect, or any one of the first implementation and the second implementation of the second aspect, in a third implementation, the node further includes: a sending module configured to send an LLDP packet whose optional TLV field is configured with TRILL capability information of the node, so that another node that receives the LLDP packet including the TRILL capability information of the node determines, according to the TRILL capability information of the node, whether to enable a TRILL function of a port through which the LLDP packet sent by the node is received.

A third aspect of the present application provides a TRILL network system, including: at least two nodes, where any one of the at least two nodes is the foregoing node.

In the present application, when a first node determines, according to TRILL capability information carried in an LLDP packet sent by a second node, that the second node has a TRILL capability, and the first node also has the TRILL capability, the first node configures a port through which the LLDP packet is received to have a TRILL function enabled, so that, in a case in which there is no manual operation, enabling a port for TRILL network connection between the first node and the second node at a peer end is implemented. In this way, not only is manual interference avoided in a TRILL network establishing process to reduce configuration pressure, but also it is helpful for efficient and correct port configuration, thereby implementing fast and automatic TRILL networking.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show some embodiments of the present invention, and a person having ordinary skill in the art may still derive other drawings from these accompanying drawings without creative efforts.

DESCRIPTION OF EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are a part rather than all of the embodiments of the present invention. All other embodiments obtained by a person having ordinary skill in the art based on the embodiments of the present invention without creative efforts shall fall within the protection scope of the present invention.

Figure 1:
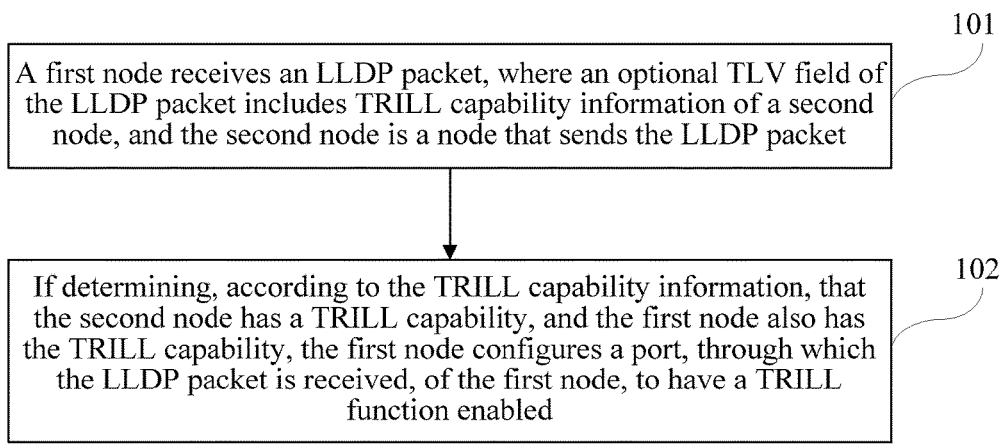
FIG. 1 is a flowchart of an embodiment of a TRILL network establishing method according to the present invention.

FIG. 1 is a flowchart of an embodiment of a TRILL network establishing method according to the present invention. As shown in FIG. 1, the method in this embodiment includes:

Step 101: A first node receives an LLDP packet, where an optional TLV field of the LLDP packet includes TRILL capability information of a second node, and the second node is a node that sends the LLDP packet.

A node in the present invention is a device, for example, a client device, a server, or a routing device, which can be connected to a communications network. According to the LLDP, the node organizes information of the node into a TLV, encapsulates the type-length-value in a Link Layer Discovery Protocol Data Unit (LLDPDU), and sends the LLDP packet to a neighboring node of the node. Concurrently, the node also receives an LLDPDU sent by the neighboring node, and stores the LLDPDU which is received from the neighboring node for a network management system to query and determine a link communication status. An LLDPDU may carry a plurality of TLV fields, which include a mandatory TLV field and an optional TLV field. A user may customize some special application information in the optional TLV field, so as to notify, by sending an LLDP packet, the neighboring node of the node of an extended special function of the node, for example, a TRILL function.

In the embodiment of the present invention, TRILL capability information of the node is defined in an optional TLV field of the LLDP packet. For example, a TRILL identifier is defined in the optional TLV field, and it is defined that, when the TRILL identifier is 1, it indicates that a node which sends the LLDP packet has a TRILL capability, and when the TRILL identifier is 0, it indicates that the node that sends the LLDP packet does not have the TRILL capability. When an LLDP packet received by the node and sent by a neighboring node of the node does not carry TRILL capability information, it is also considered that the neighboring node does not have the TRILL capability. Therefore, when the node broadcasts the LLDP packet which carries the TRILL capability information to a neighboring node of the node, a node which receives the LLDP packet may determine whether a neighboring node of the node which receives the LLDP packet has the TRILL capability according to the TRILL capability information, and therefore may further perform corresponding enabling processing.

In this step, the first node receives the LLDP packet sent by the neighboring second node, and parses the LLDP packet received by the first node, so as to obtain the TRILL capability information of the second node that is carried in an optional TLV field of the LLDP packet. The TRILL capability information is configured by the second node in the optional TLV field of the LLDP packet sent by the second node, and is used to notify the neighboring node of the node of whether the second node itself has the TRILL capability.

Step 102: If the first node determines, according to the TRILL capability information, that the second node has the TRILL capability, and the first node also has the TRILL capability, the first node configures a port through which the LLDP packet is received to have the TRILL function enabled.

When the first node determines, according to the TRILL capability information carried in the LLDP packet sent by the second node, that the second node has the TRILL capability, and determines that the first node itself also has the TRILL capability, TRILL network connection may be established between the first node and the second node. The first node enables the TRILL function for the port through which the LLDP packet is received, that is, enabling of the TRILL function at a local end is completed. For the second node at a peer end, a same processing is performed. That is, when an LLDP packet sent by the first node is received, it is determined, according to TRILL capability information of the first node carried in the packet, and the TRILL capability of the second node itself, whether to enable the TRILL function for a receiving port of the second node. After the TRILL functions are enabled for ports through which neighboring nodes are mutually and directly connected, the TRILL network connection is established. When the first node determines, according to the TRILL capability information, that the second node does not have the TRILL capability, the first node configures the port through which the LLDP packet is received to have the TRILL function disabled.

After each node in a network automatically enables or disables the TRILL function for a port of the node according to the foregoing method, a process in which a node automatically establishes a TRILL network is implemented, and manually determining the TRILL capability of a peer end and manually configuring a port to have a TRILL function enabled are not needed, thereby avoiding a manual operation performed by a person and improving working efficiency.

In the embodiment of the present invention, when determining, according to TRILL capability information carried in an LLDP packet sent by a second node, that the second node has a TRILL capability, and the first node itself also has the TRILL capability, the first node configures a port, through which the LLDP packet is received, of the first node, to have a TRILL function enabled, so that, in a case in which there is no manual operation, enabling a port for TRILL network connection between the first node and the second node at a peer end is implemented. In this way, not only is manual interference avoided in a TRILL network establishing process to reduce configuration pressure, but also it is helpful for efficient and correct port configuration, thereby implementing fast and automatic TRILL networking.

Figure 2:
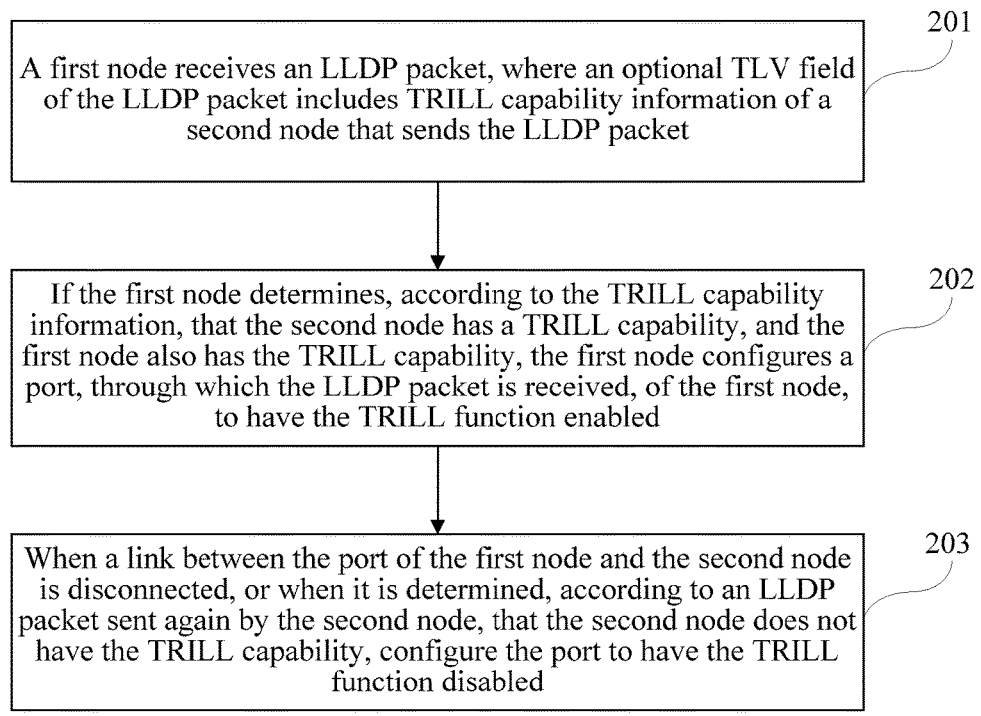
FIG. 2 is a flowchart of another embodiment of a TRILL network establishing method according to the present invention.

FIG. 2 is a flowchart of another embodiment of a TRILL network establishing method according to the present invention. As shown in FIG. 2, based on the embodiment shown in FIG. 1, the method in this embodiment further includes: a process in which a node automatically is disconnected TRILL network connection. That is, the method in this embodiment includes:

Step 201: A first node receives an LLDP packet, where an optional TLV field of the LLDP packet includes TRILL capability information of a second node that sends the LLDP packet.

Step 202: If the first node determines, according to the TRILL capability information, that the second node has a TRILL capability, and the first node also has the TRILL capability, the first node configures a port through which the LLDP packet is received to have the TRILL function enabled.

The foregoing step 201 and step 202 are the same as those in the embodiment shown in FIG. 1. That is, the TRILL function is enabled for the port of the first node.

Step 203: When a link between the port of the first node and the second node is disconnected, or when it is determined, according to an LLDP packet sent again by the second node, that the second node currently does not have the TRILL capability, configure the port to have the TRILL function disabled.

In an actual implementation, a node in a network may cancel TRILL network connection for a port which is of the node and is in the TRILL network connection. In this case, the node only needs to send an LLDP packet again to a neighboring node which needs to disconnect the TRILL network connection, of the node, and identify TRILL capability information in an optional TLV field of the packet as disabling. After receiving the LLDP packet, the neighboring node can cancel the TRILL function of a port of the neighboring node according to the TRILL capability information, so that disconnecting the TRILL network connection is implemented.

In this step, if the first node detects that the link between the first node and the second node which previously has TRILL network connection with the first node is disconnected, or detects that TRILL capability information in the LLDP packet sent by the second node indicates that the second node currently does not have the TRILL capability, the first node disables the TRILL function of a corresponding port at a local end in time, so that the TRILL network connection between the port and the second node is disconnected, and therefore this port may be used for another purpose.

In the embodiment of the present invention, on basis of achieving the technical effect of the embodiment shown in FIG. 1, further, the first node may automatically configure, according to a current link connection state and a configuration state that the second node at a peer end currently does not have the TRILL capability, where the configuration state is carried in the LLDP packet, the port through which TRILL network connection is already established to have the TRILL function disabled. In this way, TRILL network connection may be automatically disconnected in time without manual removal, which helps the port to be used for another purpose in time.

In an actual implementation, the first node and the second node in the embodiments shown in FIG. 1 and FIG. 2 have a same function. That is, both the first node and the second node have a function of configuring TRILL capability information of a node at a local end in an optional TLV field of an LLDP packet, and sending the LLDP packet to a node at a peer end, so that the node at the peer end configures, according to the foregoing method, a port of the node at the peer end to have the TRILL function enabled or disabled.

A person having ordinary skill in the art may understand that all or a part of the steps of the method embodiments may be implemented by a program instructing relevant hardware. The program may be stored in a computer readable storage medium. When the program runs, the steps of the method embodiments are executed by a processor, for example, a central processing unit (CPU). The foregoing storage medium includes any medium that can store program code, such as a read-only memory (ROM), a random-access memory (RAM), a magnetic disk, or an optical disc. Therefore, an embodiment of the present invention further provides a processor, where the processor is configured to execute steps of the method in the embodiment shown in FIG. 1 or FIG. 2. An embodiment of the present invention further provides a storage apparatus, where the storage apparatus is configured to store program instructions corresponding to the steps of the method in the embodiment shown in FIG. 1 or FIG. 2.

Figure 3:
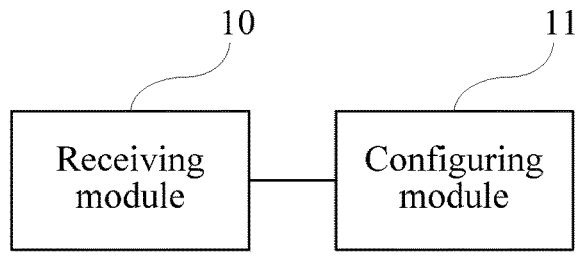
FIG. 3 is a schematic structural diagram of an embodiment of a TRILL network establishing node according to the present invention.

FIG. 3 is a schematic structural diagram of an embodiment of a TRILL network establishing node according to the present invention. As shown in FIG. 3, the node in this embodiment includes: a receiving module 10 and a configuring module 11. The receiving module 10 is configured to receive an LLDP packet, where an optional TLV field of the LLDP packet includes TRILL capability information of a second node that sends the LLDP packet. The configuring module 11 is configured to: if it is determined, according to the TRILL capability information, that the second node has a TRILL capability, and the node itself also has the TRILL capability, configure a port through which the LLDP packet is received to have a TRILL function enabled.

The node in this embodiment may be the first node in the foregoing method embodiments. The receiving module 10 of the node may receive the LLDP packet sent by the second node, the configuring module 11 may configure the port through which the LLDP packet is received to have the TRILL function enabled when it is determined, according to the TRILL capability information of the second node included in the optional TLV field of the LLDP packet sent by the second node, that the second node has the TRILL capability, and the node itself also has the TRILL capability, so as to implement automatic configuration of enabling of the TRILL function for the port.

The node in this embodiment may be configured to perform the functions in the method embodiment shown in FIG. 1, where the technical principle and achieved technical effect thereof are similar, and details of which are not described again.

Figure 4:
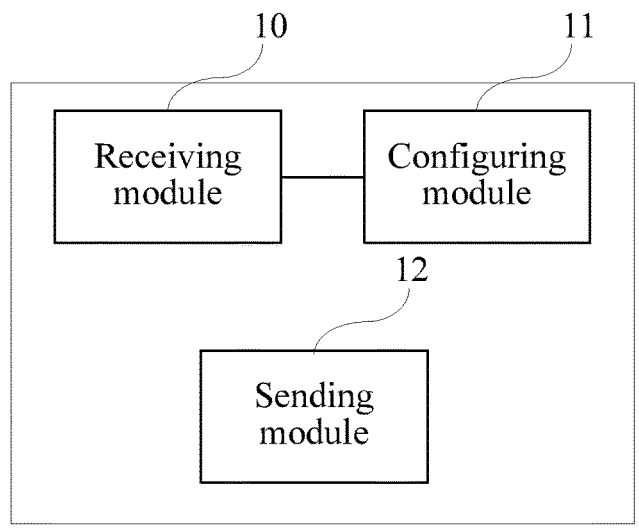
FIG. 4 is a schematic structural diagram of another embodiment of a TRILL network establishing node according to the present invention.

FIG. 4 is a schematic structural diagram of another embodiment of a TRILL network establishing node according to the present invention. As shown in FIG. 4, based on the embodiment shown in FIG. 3, the node in this embodiment further includes: a sending module 12 configured to send an LLDP packet whose optional TLV field is configured with TRILL capability information of the node itself, so that another node that receives the LLDP packet including the TRILL capability information of the node itself determines, according to the TRILL capability information of the node, whether to enable a TRILL function of a port through which the LLDP packet sent by the node is received. That is, a node at a local end sends an LLDP packet to a second node at a peer end, so that the second node at the peer end automatically configures a port to have the TRILL function enabled.

Figure 5:
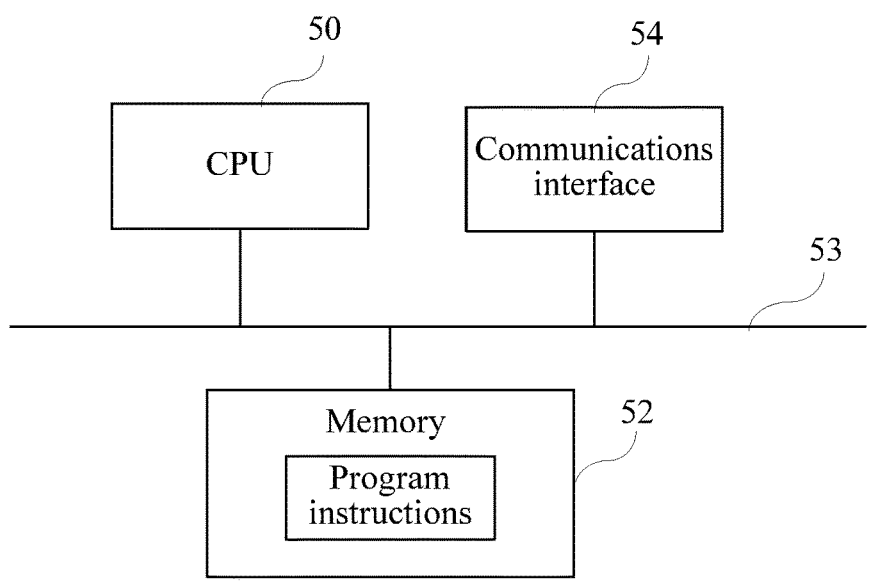
FIG. 5 is a schematic structural diagram of still another embodiment of a TRILL network establishing node according to the present invention.

FIG. 5 is a schematic structural diagram of still another embodiment of a TRILL network establishing node according to the present invention. As shown in FIG. 5, the node in this embodiment includes a CPU 50, a memory 52, a communications interface 54, and a bus 53. The CPU 50 may be configured to execute operation steps in the embodiments shown in FIG. 1 or FIG. 2. The memory 52 may be configured to store program instructions corresponding to the operation steps. The communications interface 54 may be configured to communicate with a neighboring node of the node to receive and send an LLDP packet. The bus 53 is used for communication between functional units inside the node. In an actual application, after receiving an LLDP packet sent by the neighboring node of the node, the communications interface 54 transmits the LLDP packet to the CPU 50. Meanwhile, the CPU 50 performs parsing processing on the packet according to the program instructions stored in the memory 52, and determines, according to a parsing result, whether to enable or disable a TRILL function of a port through which the LLDP packet is received.

Figure 6:
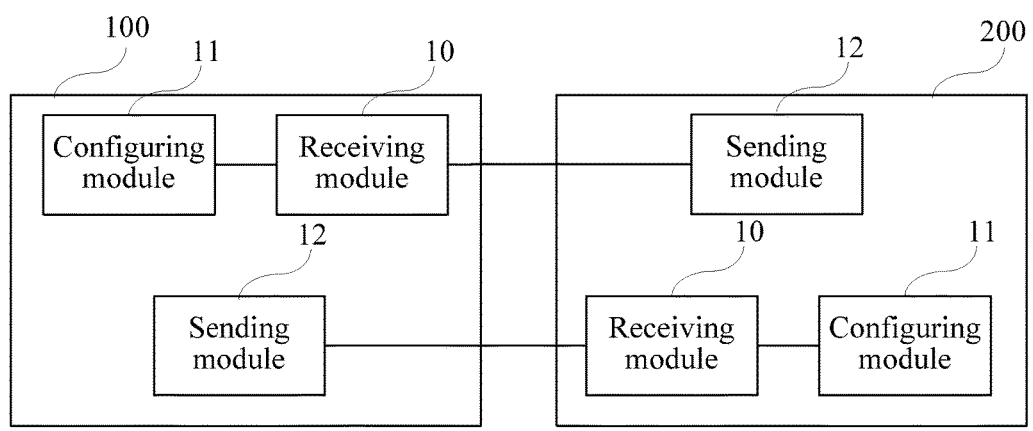
FIG. 6 is a schematic structural diagram of an embodiment of a TRILL network system according to the present invention.

An embodiment of the present invention further provides a TRILL network system, where the system includes at least two nodes, and any one of the at least two nodes is the node shown in any one of the embodiments in FIG. 3 to FIG. 5. FIG. 6 is a schematic structural diagram of the embodiment of the TRILL network system according to the present invention. As shown in FIG. 6, the system in this embodiment includes a node 100 and a node 200, where the node 100 and the node 200 are the node shown in FIG. 4. When each of two or more than two nodes in the system enables or disables a port of each node according to the methods in the method embodiments, accessing a TRILL network or exiting the TRILL network can be automatically completed, thereby implementing automatic establishment and maintenance of the TRILL network without manual interference.

Finally, it should be noted that the foregoing embodiments are merely intended for describing the technical solutions of the present invention other than limiting the present invention. Although the present invention is described in detail with reference to preferred embodiments, a person having ordinary skill in the art should understand that they may still make modifications or equivalent replacements to the technical solutions described in the present invention, without departing from the scope of the technical solutions of the embodiments of the present invention.

What is claimed is:

1. A Transparent Interconnection of Lots of Links (TRILL) network establishing method comprising:
   receiving, by a first node, a Link Layer Discovery Protocol data unit (LLDPDU) from a second node, wherein a type-length-value (TLV) field in the LLDPDU comprises a TRILL identifier, wherein a first value of the TRILL identifier indicates the second node is TRILL protocol capable, and wherein a second value of the TRILL identifier indicates the second node is not TRILL protocol capable; and
   enabling, by the first node, a TRILL function of a port through which the LLDPDU is received when the TRILL identifier in the LLDPDU is the first value,
   wherein the TRILL function of the port through which the LLDPDU is received is not enabled when the TRILL identifier in the LLDPDU is the second value.

2. The method according to claim 1, wherein after enabling, by the first node, the TRILL function of the port, the method further comprises disabling, by the first node, the TRILL function of the port when a link between the port of the first node and the second node is disconnected.

3. The method according to claim 1, further comprising sending, by the first node, an LLDPDU whose TLV field is configured with a second TRILL identifier set to the first value.

4. A Transparent Interconnection of Lots of Links (TRILL) network establishing node, comprising:
   a central processing unit (CPU);
   a memory;
   at least two communications ports; and
   a bus,
   wherein the CPU connects to the memory and the communications port through the bus,
   wherein one or more of the communications ports are configured to communicate with a second node of the TRILL network establishing node to receive a Link Layer Discovery Protocol data unit (LLDPDU),
   wherein the memory stores program instructions, and
   wherein the CPU, according to the program instructions, performs the following steps:
      receive the LLDPDU, wherein a TLV field in the LLDPDU comprises a TRILL identifier and a first value of the TRILL identifier indicates the second node is TRILL protocol capable, and wherein a second value of the TRILL identifier indicates the second node is not TRILL protocol capable; and
      enable a TRILL function of a communications port through which the LLDPDU is received when the TRILL identifier in the LLDPDU is the first value, wherein the TRILL function of a communications port through which the LLDPDU is received is not enabled when the TRILL identifier in the LLDPDU is the second value.

5. The node according to claim 4, wherein the CPU is further configured to disable the TRILL function of the communications port when a link between the communications port and the second node is disconnected.

6. The method according to claim 1, wherein the TRILL function of the port is not enabled when the port receives the LLDPDU.

7. The node according to claim 4, wherein the TRILL function of the communications port is not enabled when receiving the LLDPDU.

* * * * *